United States Patent
Williams

(10) Patent No.: US 6,889,344 B2
(45) Date of Patent: May 3, 2005

(54) SYSTEM AND METHOD FOR EXPOSING HIDDEN EVENTS ON SYSTEM BUSES

(75) Inventor: Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 09/925,594

(22) Filed: Aug. 9, 2001

(65) Prior Publication Data

US 2003/0033559 A1 Feb. 13, 2003

(51) Int. Cl.[7] .............................................. G06F 11/00
(52) U.S. Cl. ......................................................... 714/43
(58) Field of Search .............................. 714/30, 40, 27, 714/734

(56) References Cited

U.S. PATENT DOCUMENTS

| | | | |
|---|---|---|---|
| 5,951,696 A | | 9/1999 | Naaseh et al. |
| 5,978,937 A | | 11/1999 | Miyamori et al. |
| 6,047,388 A | * | 4/2000 | Bashore et al. ................ 714/38 |
| 6,128,758 A | * | 10/2000 | Hall et al. ................... 714/727 |
| 6,175,914 B1 | | 1/2001 | Mann |
| 6,202,172 B1 | | 3/2001 | Ponte |
| 6,205,560 B1 | | 3/2001 | Hervin et al. |
| 6,269,458 B1 | * | 7/2001 | Jeter et al. ..................... 714/42 |
| 6,446,164 B1 | * | 9/2002 | Nguyen et al. ............. 711/118 |
| 6,594,741 B1 | * | 7/2003 | Chang ......................... 711/156 |
| 6,643,803 B1 | * | 11/2003 | Swoboda et al. ............. 714/38 |

* cited by examiner

Primary Examiner—Bryce P. Bonzo
(74) Attorney, Agent, or Firm—Casimer K. Salys; Dillon & Yudell LLP

(57) ABSTRACT

A method and system for tracking intra-chip events within a data processing system. In accordance with the method of the present invention, an event that corresponds to a state associated with one or more internal chip signals is detected by embedded detection logic. In response to an asserted diagnostic enable flag, the event is recorded within a designated diagnostic transaction queue within an interface device that drives an off-chip system interconnect. The event is encoded within a diagnostic packet that is issued onto the off-chip system interconnect from the interface device.

24 Claims, 5 Drawing Sheets

SYSTEM AND METHOD FOR EXPOSING HIDDEN EVENTS ON SYSTEM BUSES

BACKGROUND OF THE INVENTION

1. Technical Field

The present invention generally relates to data processing systems, and in particular a method and system for identifying intra-chip events. More particularly, the present invention relates to tracking the occurrence of otherwise hidden events utilizing transaction interface logic and underutilized system interconnects.

2. Description of the Related Art

It is becoming increasingly difficult to diagnose failures in, and to measure the performance of, state-of-the-art data processing systems. This is because modem microprocessors not only operate at ever increasing clock speeds, but may also execute instructions in parallel, out of order, and speculatively. Moreover, visibility of a microprocessor's inner state has becoming limited due to the sheer design complexity and also due to practical limitations on the number of available external contact pins that may be provided on a chip package.

Conventional hardware diagnostic and performance measurement tools are typically external logic analyzers and in-circuit emulators. Logic analyzers are capable of monitoring signals on external pins and signals that are otherwise externally accessible. Logic analyzers are also capable of capturing the state of these signals and generating triggers in response to the captured signal states. However, since logic analyzers rely solely on externally available signals, they cannot analyze and/or trigger on signals that are entirely internal to a chip (i.e., signals that do not extend to pins of the chip). In-circuit emulators address this problem by mimicking the functionality of a microprocessor, thus providing visibility to the microprocessor's internal state and signals. However, since an in-circuit emulator only emulates a microprocessor's functionality, it cannot provide an absolutely accurate representation of a silicon embodiment of a microprocessor. As a result, in-circuit emulators are more useful for debugging system software than system hardware. Furthermore, simulation of complex on-chip systems, such as multiprocessor designs, by in-circuit emulators is impracticable in terms of cost and complexity.

One approach that partially addresses the foregoing limitations is to implement an on-chip debugging system. One such system is disclosed in U.S. Pat. No. 5,951,696, titled "Debug System With Hardware Breakpoint Trap", issued Sep. 14, 1999 to Naaseh, et al. An on-chip system for debugging a microprocessor is disclosed therein that provides visibility of a chip's internal state without interfering with the normal state of the object silicon device (i.e., test and debug occur under actual system environment conditions, and while the microprocessor is operating "at speed"). The central feature of the technique employed by Naaseh et al. is utilization of a hardware breakpoint trap (HBT) that is triggered in response to a programmed combination of a number of triggers to allow the current state of the processor to be preserved prior to, and restored following, capture of a debug event. The HBT generation means (i.e., trigger and event generation means) are incorporated within the microprocessor chip, while requisite debug software utilized for preserving and restoring a current processor state is stored anywhere in the system's memory.

The system set forth by Naaseh et al. utilizes dedicated debug busses for carrying the debugging data off the chip to external debug equipment. Although the implementation of on-chip debugging functionality reduces the number of external pins required as circuit access points for logic analyzers and the like, at least some additional pins are required to accommodate the dedicated debug busses. Another problem with the dedicated debug bus disclosed by Naaseh et al. is that it does not provide a means by which captured debug can be selectively routed and thus conveniently accessed and processed within a given data processing system.

The need for an improved pervasive debugging tool is becoming particularly great with the continued development of complex data processing systems contained within one or only a few discrete silicon elements. Examples of situations requiring a comprehensive debug system include system-on-chip technology, and hierarchical data storage systems shared by multiple processors.

From the foregoing, it can therefore be appreciated that a need exists for an improved debugging tool that provides an accurate in-circuit representation of diagnostic signals without the need for additional pins to route such signals to off-chip equipment.

SUMMARY OF THE INVENTION

A method and system for tracking intra-chip events within a data processing system are disclosed herein. In accordance with the method of the present invention, an event that corresponds to a state associated with one or more internal chip signals is detected by embedded detection logic. In response to an asserted diagnostic enable flag, the event is recorded within a designated diagnostic transaction queue within an interface device that drives an off-chip system interconnect. The event is encoded within a diagnostic packet that is issued onto the off-chip system interconnect from the interface device.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures.

While this invention is described in terms of the best mode for achieving this invention's objectives, it will be appreciated by those skilled in the art that variations maybe accomplished in view of these teachings without deviating from the spirit or scope of the present invention. Although, the present invention will be described herein in terms of a particular system and particular components, one of ordinary skill in the art will readily recognize that this method and system will operate effectively for other components in a data processing system.

As utilized herein, an "event" is any functionally or logically quantifiable result that is associated with one or more signals corresponding to a state within the object system. In an important feature of the present invention, much of the extant data processing and storage infrastructure is utilized to generate and route diagnostic event packets.

Figure 1:
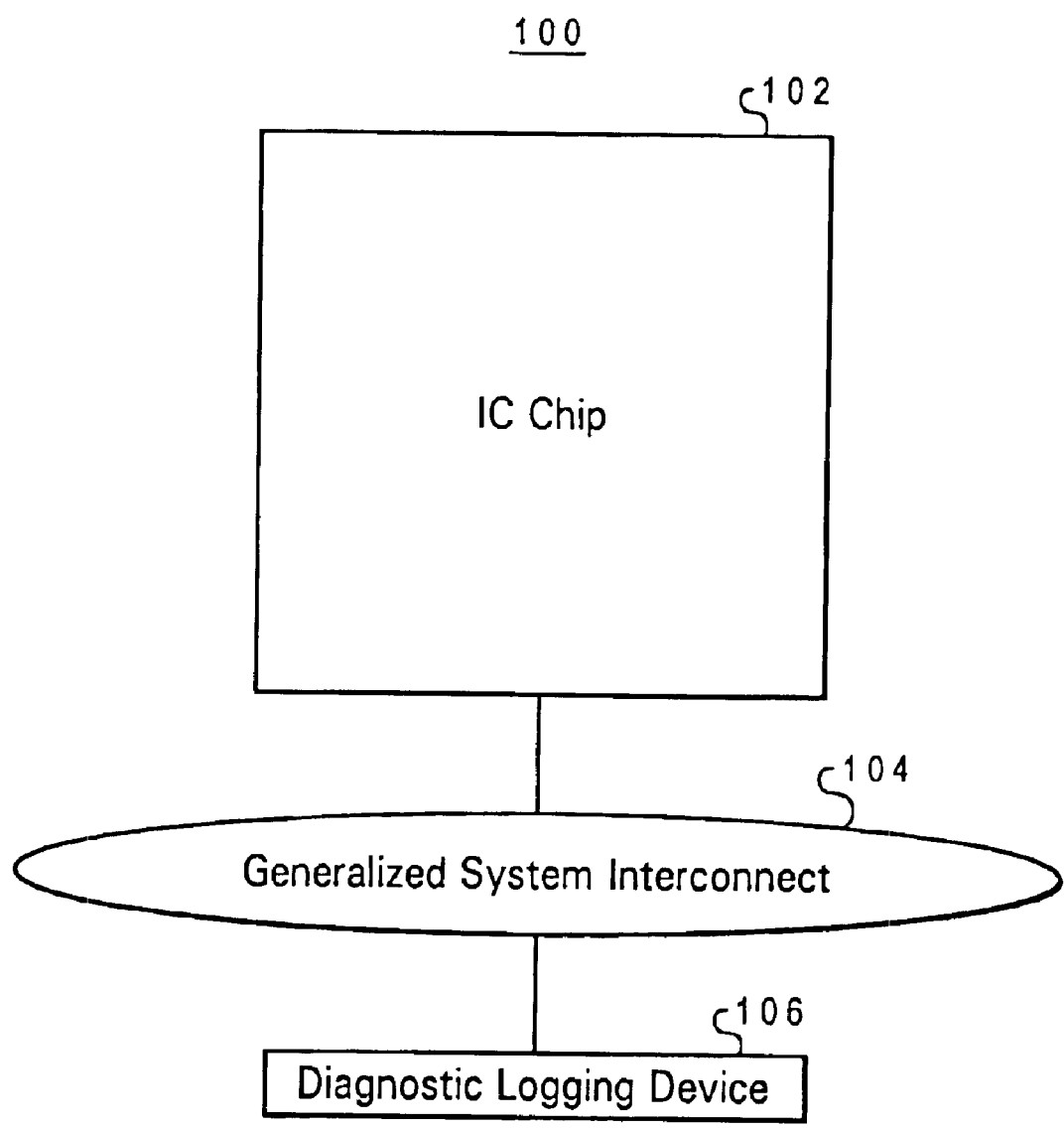
FIG. 1 is a block diagram depicting an integrated circuit chip connectivity with a generalized system interconnect.

With reference now to the figures, and in particular with reference to FIG. 1, a block diagram of an integrated circuit (IC) system apparatus 100 in which a preferred embodiment of the present invention may be implemented is depicted. IC system apparatus 100 may be incorporated within any of a variety of data processing systems. For example, IC system apparatus 100 includes an IC chip 102 that, in one embodiment of the present invention contains complex processor functionality such as that found in symmetric multiprocessor (SMP) systems. As explained in further detail with reference to FIGS. 2–5, the present invention provides a system and method whereby internal signals within IC chip 102, which would otherwise remain hidden from external analysis, are examined with respect to a given diagnostic criteria and then delivered from the boundary of IC chip 102 for external storage and analysis.

As illustrated in FIG. 1, IC chip 102 is communicatively coupled with a generalized system interconnect 104 that is external to the chip boundary of IC chip 102. In a context wherein IC chip 102 houses a processing unit (or multiple processing units), generalized system interconnect 104 may be a system bus. More specifically, if the processing functionality housed within IC chip 102 employs bus transactions, generalized system interconnect 104 may be a system address or data bus. In the case in which generalized system interconnect 104 is a system address or data bus, data access transactions are provided to and from the processing functionality aboard IC chip 102 from other system units housed by other chips (not depicted) such as system memory chips or other processing units.

As utilized herein, the "state" within an IC chip refers to a combination of one or more signals internal to the chip that define a particular event of interest with respect to diagnostic and/or debugging of the system. A fundamental goal of the present invention is to provide means for detecting an event responsive to a state within IC chip 102 and for broadcasting the occurrence of the event on generalized interconnect 104 without the need for dedicated pins at the boundary of IC chip 102. To this end, upon detecting an occurrence of an event, a detection logic element (not depicted) within the boundary of IC chip 102 delivers an event detection signal to an interconnect interface device (not depicted). The interconnect interface device encapsulates the event data with a packet that is deliverable in accordance with the protocol utilized on generalized system interconnect 104.

Prior to delivering the packet onto generalized system interconnect 104, a transaction type field, or its equivalent, is encoded with a diagnostic identifier code that identifies the packet as a diagnostic packet. Such transaction type identification is necessary when delivering event-based packets onto an interconnect, such as generalized system interconnect 104 that is utilized as a medium for inter-chip transmission of alternative non-diagnostic transaction packets. As further depicted in FIG. 1, IC system apparatus 100 includes a diagnostic logging device 106 that is programmed to retrieve packets from generalized system interconnect 104 in accordance with the transaction type encoding. Diagnostic logging device 106 essentially functions as a passive listener, or snooper, on generalized system interconnect 104 with respect to designated diagnostic packets.

Figure 2:
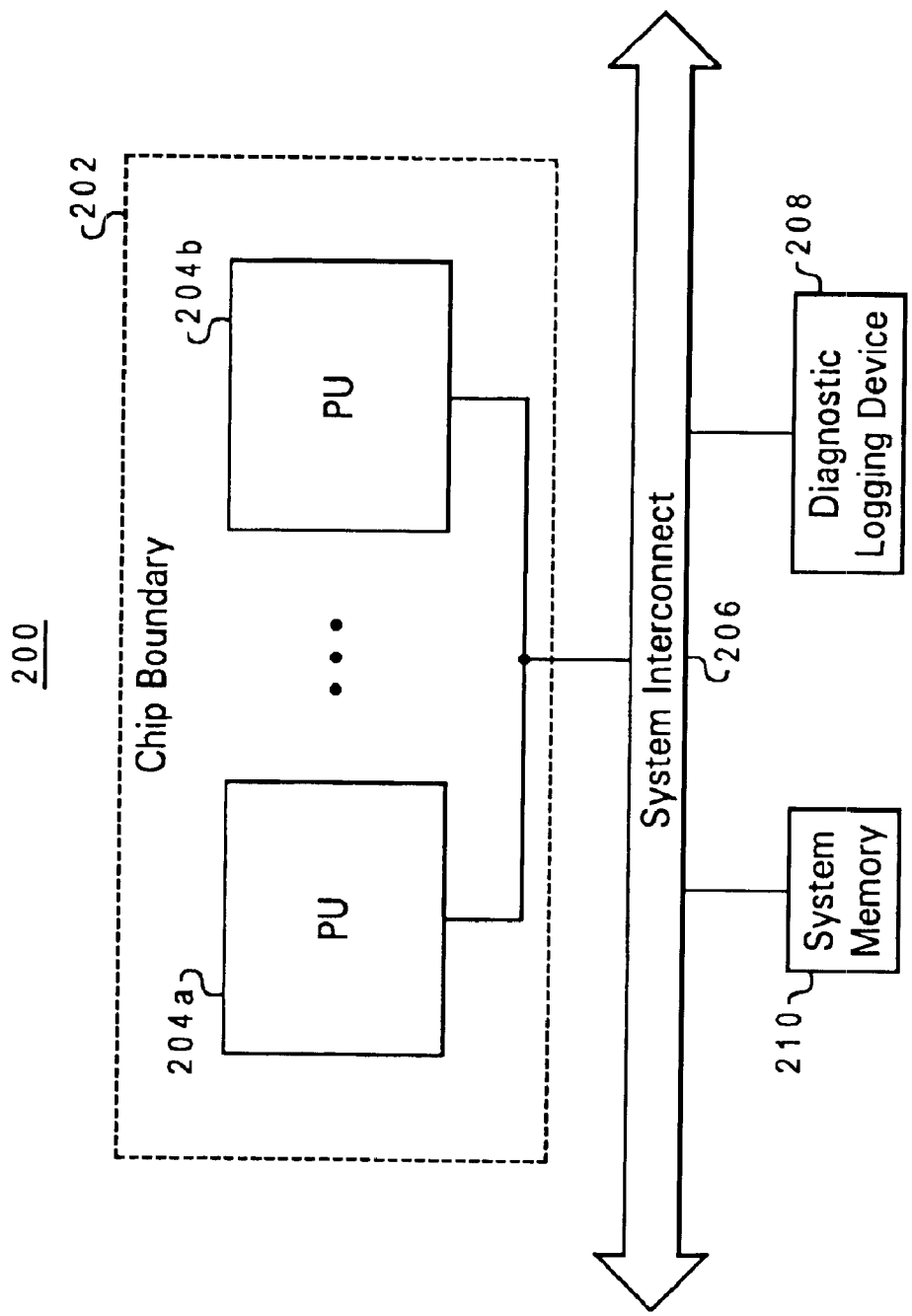
FIG. 2 is a block diagram illustrating a data processing system in which a preferred embodiment of the present invention may be implemented.

Referring to FIG. 2, there is depicted a block diagram illustrating a data processing system 200 in which a preferred embodiment of the present invention may be implemented. As shown in FIG. 2, data processing system 200 includes multiple processing units 204a–204b that are housed within a single chip boundary 202. Together, processing units 204a–204b compose a symmetric multiprocessor (SMP) system. Although not explicitly depicted in FIG. 2, each processor 204a–204b includes a respective on-chip L1 cache bifurcated into separate instruction and data caches. Each processor 204a–204b is coupled via a system interconnect 206 to a system memory 210, which is shared by multiple processors in the exemplary embodiment.

Although in the exemplary embodiment only two processors are depicted, those skilled in the art will appreciate that additional processors sharing a common data storage resource such as system memory 210 maybe utilized in a multiprocessor data processing system in accordance with the present invention. Those skilled in the art will additionally recognize that data processing system 200 may include many additional components not shown in FIG. 2, such as serial and parallel ports, connections to networks or attached devices, a memory controller regulating access to system memory 210, etc. Such modifications and variations are within the spirit and scope of the present invention.

In accordance with the depicted embodiment, a diagnostic logging device 208 is coupled to system interconnect 206. As explained in further detail with reference to the following figures, diagnostic logging device 208 includes logic for identifying and logging diagnostic event packets as the packets traverse system interconnect 206.

Figure 3A:
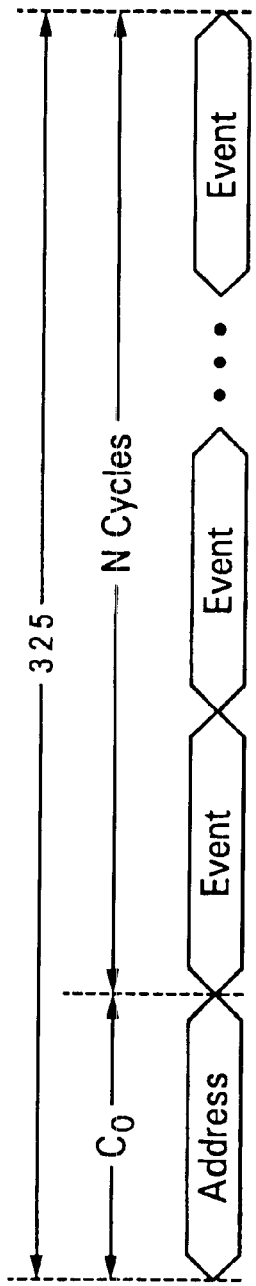
FIG. 3A is a timing diagram depicting a diagnostic packet in accordance with a preferred embodiment of the present invention.
Figure 3B:
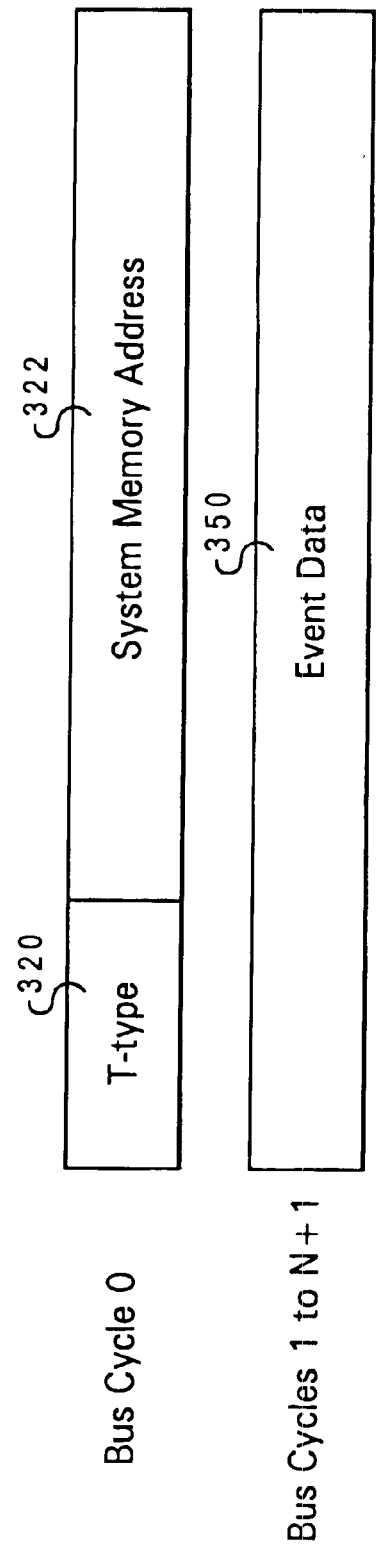
FIG. 3B illustrates data structures employed within a diagnostic packet in accordance with a preferred embodiment of the present invention.

FIGS. 3A and 3B depict a timing diagram and corresponding diagnostic packet data structure, respectively, employed in accordance with a preferred embodiment of the present invention. In the exemplary embodiment, a diagnostic packet is delivered from chip boundary 202 in N+1 bus cycles onto system interconnect 206. However, the diagnostic packet transmission as depicted in FIGS. 3A and 3B may be transmitted on any external (i.e., outside chip boundaries) system interconnect by any processing or storage device from which an event is detected.

To facilitate diagnostic testing performed with respect to data access transactions (e.g., READ or WRITE memory operations), it may often be advantageous to determine and record the memory address associated with a given event. As part of most standard bus transfer protocols for READ and WRITE transactions, an address identifying the object memory location is encoded within each data transfer request and each corresponding response. The exemplary embodiment illustrated in FIG. 3A depicts a diagnostic packet transmitted over multiple cycles 325 that includes an address associated with a detected event. The address is delivered on a first bus clock cycle, $C_0$, and as illustrated in FIG. 3B includes a transaction type (ttype) field 320 and a system memory address field 322. Ttype field 320 includes a coded identifier of one or more bits that identify the packet as a diagnostic packet, thus enabling diagnostic logging device 208 to recognize and retrieve the packet when it is broadcast onto system interconnect 206. Memory address field 322 identifies the memory location (e.g., a READ request address) included within a data access transaction associated with the object event. As further depicted in FIGS. 3A and 3B, the event data is encapsulated within an event data structure 350 and transmitted on system interconnect 206 on cycles 1 through N following transmission of the address and ttype.

In an important feature of the present invention, the physical and logic media utilized to deliver a diagnostic packet, such as that depicted in FIGS. 3A and 3B, comprise data processing devices and protocols that maybe customized to suit the needs of diagnostic packet transport as described herein. For example, such physical and logical media are incorporated by system interconnect 206, which in a preferred embodiment of the present invention is a system address bus. As explained in further detail with reference to FIG. 4, a system address bus is includes the requisite functionality for delivering diagnostic packets from within a chip boundary to an externally coupled diagnostic logging device or logic analyzer. Moreover, a system address bus employs an extant data transfer protocol that is conveniently extendable to the processing and delivery of diagnostic packet data structures. Many system bus architectures employing different transfer protocols are known in the art. Thus, the details regarding the structure and delivery of the diagnostic packet data structure illustrated in FIGS. 3A and 3B do not limit the scope of the invention claimed herein.

In accordance with a preferred embodiment of the present invention, detection logic embedded within various processing and/or storage devices deliver event signals to local bus interface units wherein the event is encapsulated in a packet format. Furthermore, if the event results from a data access request (a castout of a shared cache line resulting from a READ request, for example), an address corresponding to the object memory location is appended to the diagnostic packet. The diagnostic packet is then delivered onto a system address or data bus wherein it is snooped and retrieved by a diagnostic logging device from which it may be extracted and processed by externally diagnostic utility devices.

Figure 4:
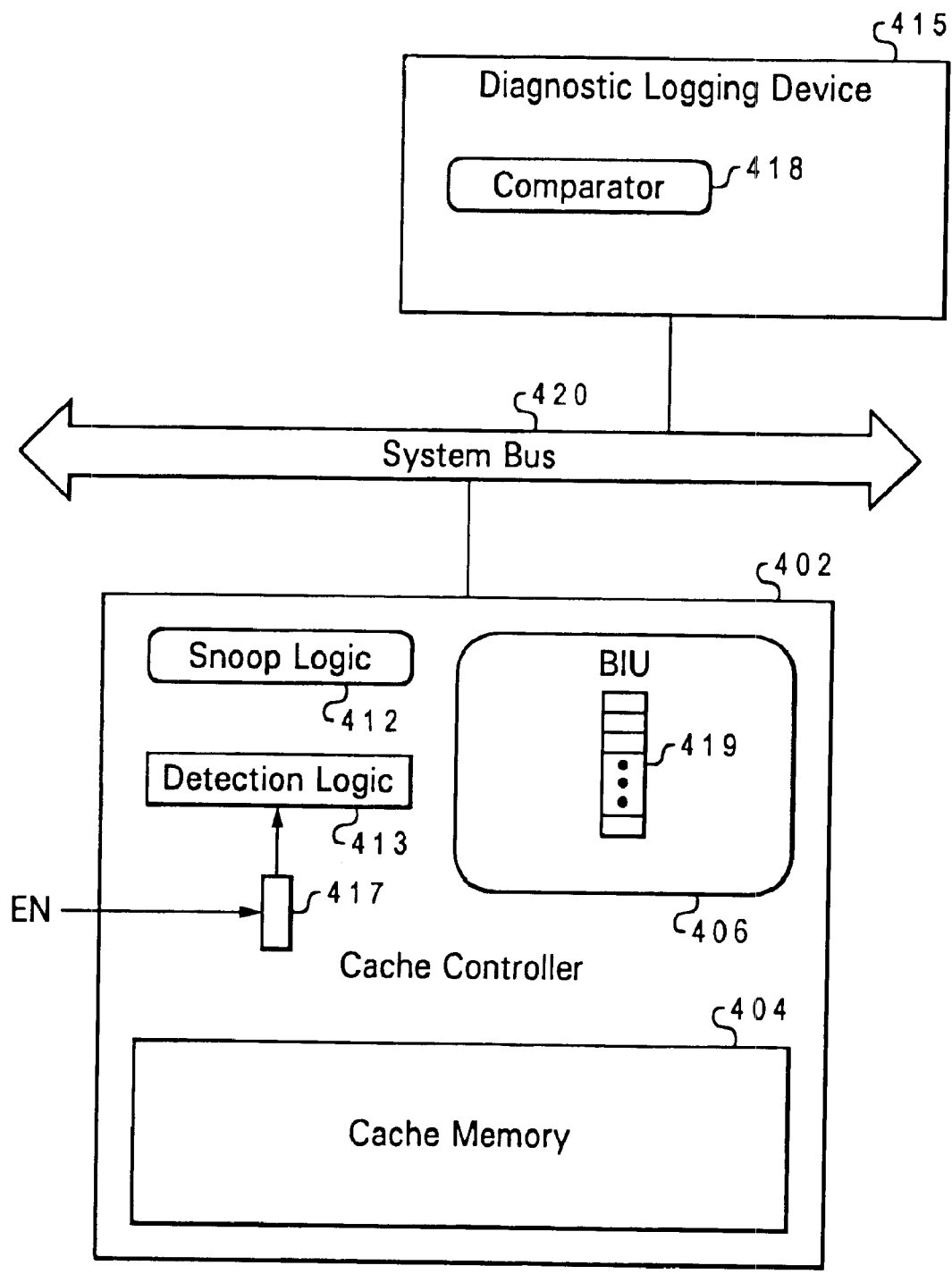
FIG. 4 depicts a diagram of a storage device that employs system bus diagnostic transactions in accordance with a preferred embodiment of the present invention.

With reference now to FIG. 4, there is depicted a diagram of an event tracking system 400 implemented within a data storage context in accordance with a preferred embodiment of the present invention. Event tracking system 400 includes a cache controller 402 having elements that are applicable as cache units (not depicted) within processing units 204a–204b. Cache controller 402 receives and transmits operations relating to data within a cache memory 404 from upstream and downstream buses through a BIU 406. A directory lookup (not depicted) is employed to locate cache lines within cache memory 404. Addition logic presumably incorporated within cache controller 402 determines the status of current cache lines to implement the replacement policy for updating cache lines within cache memory 404. Snoop logic 412 detects operations initiated by devices coupled to a system bus 420. Snoop logic 412 also controls the snoop response driven by the respective target device in response to snooped operations.

Event tracking system 400 further includes a debug infrastructure comprising in part a detection logic module 413 within cache controller 402. Within its respective host unit, a detection logic module, such as detection logic module 413, is designed to detect occurrences of specified events that occur as a direct result of or incidentally to the logic operations of their respective units. Debug software (not depicted) may be utilized to program the triggering conditions that precipitate detection of an event by detection logic module 413. Such debug software may be stored in one or more of the memories accessible to, but possibly external to cache controller 402. In conformance with the system depicted in FIG. 4, a method of capturing intra-chip events comprises monitoring signals internal to the host unit (i.e. a chip containing cache controller 402), and detecting an event in response to a pre-programmed combination of one or more internal signals.

With continued reference to FIG. 4, and assuming that a cache miss occurs within cache controller 402, which requires a castout of a shared cache line, and further assuming that detection logic module 413 has been programmed to detect such an event, an event signal is sent from detection logic module 413 to BIU 406. BIU 406 stores the event signal information within a diagnostic transaction queue 419. BIU 406 then formulates and delivers a diagnostic packet onto an address bus within system bus 420 that includes the event address, if required, and the event data. The diagnostic packet is then retrieved by a diagnostic logging device, such as diagnostic logging device 415. The ttype encoded within the diagnostic packet is utilized by diagnostic logging device 415 and other BIU's to recognize and properly route or queue the packet.

The present invention provides an overflow protection feature that addresses the capacity limitations for diagnostic transaction queue 419. As explained in further detail with reference to FIG. 5, the diagnostic packet tracking system of the present invention preferably utilizes a multi-purpose system interconnect as the broadcast medium for diagnostic packets. Furthermore, in a preferred embodiment, the diagnostic packets are delivered on otherwise unutilized bus cycles (e.g., no pending transactions for a system address or databus). In such an embodiment in which BIU 406 opportunistically releases diagnostic packets onto system bus 420 only when there are no pending higher-priority packets, queue overflow issues must be addressed.

In accordance with the teachings of the present invention, a diagnostic packet overrun condition is addressed in one of two ways. The first option is to deliver a slow down signal to the logic (e.g., cache memory 404) wherein events are generated. The slow down signal directs the event-generating logic to reduce the rate at which event-precipitating states are produced. This first option is beneficial for diagnostic applications that are intolerant of even minimal diagnostic packet loss. However, considerable additional logic and signal paths would be required to implement this option. In addition, the effects of the slow down instruction may alter the behavior of the system sufficiently to skew diagnostic results.

The second option for addressed diagnostic packet overrun is to deliver an overrun flag onto system bus 420 to notify the diagnostic packet recipient (e.g., diagnostic logging device 415) that subsequently received diagnostic data is compromised by the need to discard at least some diagnostic packets. The second option is much simpler and less expensive to implement at the cost of diagnostic packets being discarded.

In a preferred embodiment diagnostic transaction queue 419 is a dedicated buffer for holding diagnostic packets prior to broadcast on system bus 420. However, within the spirit and scope of the present invention, alternative queues, such as data access transaction queues may also serve to buffer diagnostic packets.

The present invention provides a particularly efficient means for extracting diagnostic/debug data from events occurring internally within a chip boundary onto an external broadcast medium (i.e., an inter-chip system interconnect) without the need for additional dedicated chip pins. As explained in the following example of a tracked intra-chip event, the present invention is particularly useful for tracking "silent" transactions (i.e., transactions that occur entirely on-chip without an externally broadcast indication thereof). A castout of a cache line is well understood by those skilled in the art of hierarchical data storage systems as an operation in which a cache block is deallocated in order to allow the cache block to cache a different memory segment. In those circumstances where the deallocated block is modified relative to main memory, and referring to FIG. 4, an address and data transaction is broadcast on a system bus 420 to communicate the updated image of the memory segment to cache controller 402. Such castouts carried by an inter-chip interconnect (i.e., system bus 420) and are thus directly visible to diagnostic logging equipment.

A "silent" castout occurs when the segment being deallocated by the castout is not modified relative to memory, since no external bus transactions are broadcast. Thus, the castout occurs "silently" within the processor chip. For diagnostic/debugging purposes, it maybe advantageous to detect occurrences of such silent castouts since they result in modification of cache content. In such cases, the mechanism of the present invention generates a diagnostic packet for such "silent" castouts that is broadcast on system bus 420 and re-uses existing pins and buses to convey the diagnostic packets to diagnostic logging device 415.

Referring to FIGS. 3A and 3B in conjunction with FIG. 4, if the event identified within the diagnostic packet is a silent castout of a cache line, event data structure 350 includes an encoded description of a castout (i.e., information identifying the event as a castout), while memory address field 322 may include the corresponding cache line address from which the castout occurred. After being delivered onto system bus 420, the diagnostic packet is snooped and logged by diagnostic logging device 415. In this manner, a data access transaction (silent castout) which would otherwise be hidden outside the chip boundary housing cache controller 402, is made externally available on system bus 420.

The debugging infrastructure within cache controller 402 further includes an debug enable register 417 that is asserted or de-asserted in accordance with signal EN. By de-asserting the value in debug enable register, the system can disable detection logic module 413 from sending any diagnostic information to BIU 406.

Upon receipt of a diagnostic packet on system bus 420, which acts as a snoop node for all attached data storage devices, diagnostic logging device utilizes a comparator 418 to verify that the ttype encoded within the diagnostic packet matches a predetermined diagnostic packet identifier. If a match exists, the diagnostic packet is removed from system bus 420 by diagnostic logging device 415.

Although only one system interconnect is depicted in FIGS. 1, 2, and 4, one skilled in the art will understand that the inventive concept set forth herein is applicable to a multi-hop system interconnect comprising multiple distinct interconnects (segments). In such cases, a bridging device separates each of the multi-hop segments and functions, in part, to relay a transaction packet to the next hop such that all devices coupled to any of the hop segments may snoop each transaction packet. The logging of diagnostic packets is usually only required at a single diagnostic logging device. Therefore, in a multi-hop environment, the distribution mechanism of the present invention includes programming each of the bridging devices to remove a diagnostic packet if a diagnostic logging device is coupled to the upstream bus segment. This feature further supports efficient collection and transmission of diagnostic packets by reducing the number of bus cycles consumed for any given diagnostic packet broadcast in a multi-hop environment.

Figure 5:
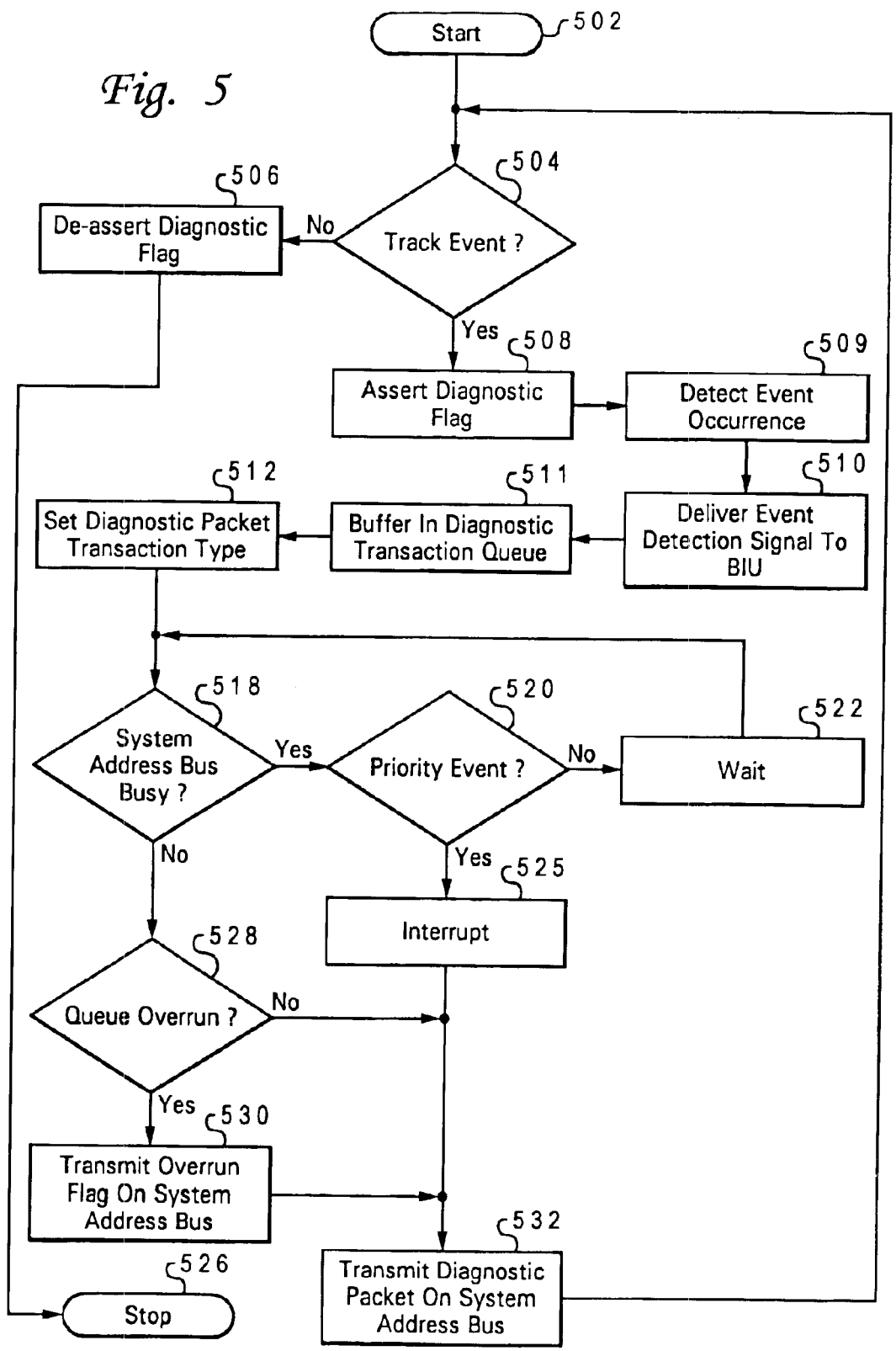
FIG. 5 is a flow diagram illustrating a method for tracking diagnostic events in accordance with the present invention.

With reference to FIG. 5, there is depicted a flow diagram illustrating a method for tracking diagnostic events in accordance with a preferred embodiment of the present invention. The process begins as shown at step 502 and proceeds to step 504 wherein is depicted a determination of whether or not to track a particular event. If, as illustrated at steps 506 and 526, it is decided not to track the event, a diagnostic flag associated with the object event detection device is de-asserted and the process terminates. Upon a decision to track the event, the diagnostic flag is asserted thus enabling the detection device to deliver event detection signals to its local BIU as depicted at steps 508, 509, and 510. As part of delivery and as illustrated at step 511, the diagnostic packet is queued within a designated diagnostic transaction buffer within the BIU.

As part of the diagnostic packet processing performed by the BIU, a transaction type identifying the packet as a diagnostic packet is encoded within the packet such that system bus snoopers can distinguish diagnostic transactions comprising diagnostic packets from data access transactions comprising data access requests and responses (step 512). While the system address bus is being utilized to transmit alternate (i.e., non-diagnostic) transaction packets (e.g., data access packets), and as illustrated at step 518 and 520, a further determination may be made of whether or not the priority of the event warrants interrupting the bus. If so, the bus is interrupted and the diagnostic packet is sent immediately (step 525 and 532). Otherwise, as illustrated at step 522, the BIU waits until the system address bus is unutilized before sending the diagnostic packet.

In addition to determining that the system address bus is free from non-diagnostic traffic (step 518) and thus a diagnostic packet may be broadcast (step 532), a further determination is made of whether or not a diagnostic transaction queue overrun condition has occurred as depicted at step 528. If not, the diagnostic packet is issued onto a system address bus during one or more otherwise unutilized cycles (step 532). When an overrun condition is detected, an overrun flag is broadcast onto the system address bus notifying the diagnostic logging device that subsequent diagnostic data may be incomplete due to the need to discard diagnostic packets (step 530). The present invention provides an alternative approach to a diagnostic queue overrun condition wherein the BIU delivers a signal instructing the event-originating logic to reduce the rate at which event-precipitating states are entered, thus avoiding the need to discard diagnostic packets. As previously explained with reference to FIG. 4, however, this slow-down approach requires additional logic and signal paths and may distort diagnostic results by changing the relative speed of system operations.

A method and system have been disclosed for tracking events within a data processing system. Software written according to the present invention is to be stored in some form of computer readable medium, such as memory, CD-ROM or transmitted over a network, and executed by a processor. Alternatively, some of all of the present invention could be implemented in hardware. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for tracking intra-chip events within a data processing system, said method comprising:

detecting an event responsive to a state within an integrated circuit chip;

responsive to the detection of said event, recording an occurrence of said event within an interface device that drives a system address bus having active cycles during which data access transactions are delivered and inactive cycles during which data access transactions are not delivered; and broadcasting the detected event by issuing a packet denoting the occurrence of the event from said interface device to the system address bus, said issuing step comprising delivering the packet on said system address bus only during inactive cycles.

2. The method of claim 1, further comprising retrieving said packet from said system address bus at a diagnostic logging device.

3. The method of claim 2, wherein said retrieving said packet at a diagnostic logging device comprises:

snooping said system address bus;

determining whether or not said packet includes a diagnostic transaction type identifier; and in response to said packet including a diagnostic transaction type identifier, recording said event within said diagnostic logging device.

4. A system for tracking intra-chip events within a data processing system, said system comprising:

detecting an event responsive to a state within an integrated circuit chip;

responsive to said detecting an event, recording an occurrence of said event within a bus interface unit operating in a data storage system, said bus interface unit driving an off-chip system interconnect utilized to transmit non-diagnostic transactions within said data processing system, said bus interface unit programmed to identify a given packet on said system interconnect in accordance with a transaction type field encoded within said given packet, wherein said recording step comprises:

identifying said packet as a diagnostic packet from data encoded within said transaction type field; and in response to said identifying step, storing said diagnostic packet within a diagnostic transaction queue; and broadcasting said detected event by issuing a packet from said bus interface unit denoting the occurrence of said event onto said off-chip system interconnect, said issuing step preceded by setting a transaction type identifier within said packet, wherein said transaction type identifier identifies said packet as a diagnostic packet.

5. The method of claim 4, wherein said event is precipitated by a data access transaction within said data storage system, said method further comprising associating a memory address with said diagnostic packet.

6. The method of claim 5, wherein said event is a castout of a shared cache line, said associating step comprising tagging said diagnostic packet with the address of said shared cache line.

7. A method for tracking intra-chip events within a data processing system, said method comprising:

detecting an event responsive to a state within an integrated circuit chip;

broadcasting said detected event on an off-chip system interconnect that is utilized to transmit non-diagnostic transactions within said data processing system;

retrieving said packet from said off-chip system interconnect at a diagnostic logging device;

extracting diagnostic data from said packet; and delivering said diagnostic data to a trace array logic device or a logic analyzer.

8. A method for tracking intra-chip events within a data processing system, said method comprising:

utilizing a detection logic element to detect an event responsive to a state within an integrated circuit chip;

responsive to detecting said event, recording an occurrence of said event within an interface device included within a data storage device, said interface device driving said off-chip system interconnect, said recording including delivering an event detection signal from said detection logic element to said interface device; and broadcasting said detected event on an off-chip system interconnect that is utilized to transmit non-diagnostic transactions within said data processing system.

9. The method of claim 8, wherein said delivering step is preceded by setting an event trigger condition within said detection logic element.

10. The method of claim 9, wherein said event is a castout of a shared cache line, said setting step comprising setting said event trigger condition to detect an occurrence of a castout of a shared cache line within said data storage device.

11. The method of claim 9, wherein said step of setting an event trigger condition comprises asserting a diagnostic flag readable by said detection logic element, wherein said asserted diagnostic flag enables said detection logic to deliver said event detection signal to said interface device.

12. The method of claim 11, further comprising the step of de-asserting said diagnostic flag such that said detection logic element is disabled from delivering said event detection signal to said interface device.

13. A system for tracking intra-chip events within a data processing system, said system comprising:

processing means for detecting an event responsive to a state within an integrated circuit chip;

processing means responsive to the detection of said event for recording an occurrence of said event within an interface device that drives a system address bus having active cycles during which data access transactions are delivered and inactive cycles during which data access transactions are not delivered; and processing means for broadcasting the detected event by issuing a packet denoting the occurrence of the event from said interface device to the system address bus, said issuing step comprising delivering the packet on said system address bus only during inactive cycles.

14. The step of claim 13, further comprising processing means for retrieving said packet from said system address bus at a diagnostic logging device.

15. The system of claim 14, wherein said processing means for retrieving said packet at a diagnostic logging device comprises:

processing means for snooping said system address bus;

processing means for determining whether or not said packet includes a diagnostic transaction type identifier; and processing means responsive to said packet including a diagnostic transaction type identifier for recording said event within said diagnostic logging device.

16. A system for tracking intra-chip events within a data processing system said system comprising:

processing means for detecting an event responsive to a state within an integrated circuit chip;

processing means responsive to said detecting for recording an occurrence of said event within a bus interface unit operating in a data storage system, said bus interface unit driving an off-chip system interconnect utilized to transmit non-diagnostic transactions within said data processing system, said bus interface unit programmed to identify a given packet on said system interconnect in accordance with a transaction type field encoded within said given packet;

processing means for identifying said packet as a diagnostic packet from data encoded within said transaction type field; and processing means responsive to said identifying said packet as a diagnostic packet for storing said diagnostic packet within a diagnostic transaction queue; and processing means for broadcasting said detected event by issuing a packet from said bus interface unit denoting the occurrence of said event onto said off-chip system interconnect said issuing step preceded by setting a transaction type identifier within said packet, wherein said transaction type identifier identifies said packet as a diagnostic packet.

17. The system of claim 16, wherein said event is precipitated by a data access transaction within said data storage system, said system further comprising processing means for associating a memory address with said diagnostic packet.

18. The system of claim 17, wherein said event is a castout of a shared cache line, said processing means for associating a memory address with said diagnostic packet comprising processing means for tagging said diagnostic packet with the address of said shared cache line.

19. A system for tracking intra-chip events within a data processing system, said system comprising:

processing means for detecting an event responsive to a state within an integrated circuit chip;

processing means for broadcasting said detected event on an off-chip system interconnect that is utilized to transmit non-diagnostic transactions within said data processing system;

processing means for retrieving said packet from said off-chip system interconnect at a diagnostic logging device;

processing means for extracting diagnostic data from said packet; and processing means for delivering said diagnostic data to a trace array logic device or a logic analyzer.

20. A method for tracking intra-chip events within a data processing system, said system comprising:

a detection logic element for detecting an event responsive to a state within an integrated circuit chip;

processing means responsive to detecting said event for recording an occurrence of said event within an interface device included within a data storage device, said interface device driving said off-chip system interconnect, said recording including delivering an event detection signal from said detection logic element to said interface device; and processing means for broadcasting said detected event on an off-chip system interconnect that is utilized to transmit non-diagnostic transactions within said data processing system.

21. The system of claim 20, further comprising processing means for setting an event trigger condition within said detection logic element.

22. The system of claim 21, wherein said event is a castout of a shared cache line, said processing means for setting an event trigger condition within said detection logic element comprising processing means for setting said event trigger condition to detect an occurrence of a castout of a shared cache line within said data storage device.

23. The system of claim 21, wherein said processing means for setting an event trigger condition comprises processing means for asserting a diagnostic flag readable by said detection logic element, wherein said asserted diagnostic flag enables said detection logic to deliver said event detection signal to said interface device.

24. The system of claim 23, further comprising processing means for de-asserting said diagnostic flag such that said detection logic element is disabled from delivering said event detection signal to said interface device.

* * * * *